United States Patent
Takamori et al.

(10) Patent No.: US 7,436,755 B2
(45) Date of Patent: *Oct. 14, 2008

(54) OPTICAL INFORMATION RECORDING MEDIUM, RECORDING AND REPRODUCTION METHODS USING THE SAME, OPTICAL INFORMATION RECORDING DEVICE, AND OPTICAL INFORMATION REPRODUCTION DEVICE

(75) Inventors: Nobuyuki Takamori, Kitakatsuragi-gun (JP); Go Mori, Nara (JP); Masaki Yamamoto, Yamatokoriyama (JP); Hideharu Tajima, Izumi (JP)

(73) Assignee: Sharp Kabushiki Kaisha, Osaka (JP)

( * ) Notice: Subject to any disclaimer, the term of this patent is extended or adjusted under 35 U.S.C. 154(b) by 685 days.

This patent is subject to a terminal disclaimer.

(21) Appl. No.: 10/713,349

(22) Filed: Nov. 14, 2003

(65) Prior Publication Data

US 2004/0264355 A1    Dec. 30, 2004

(30) Foreign Application Priority Data

Nov. 18, 2002   (JP) ............................. 2002-334200
May 15, 2003   (JP) ............................. 2003-137569

(51) Int. Cl.
*G11B 7/24* (2006.01)

(52) U.S. Cl. ..................... 369/275.1; 369/288; 428/64.4

(58) Field of Classification Search ... 369/275.1–275.5, 369/288, 59.25, 109.01, 110.01, 110.03, 369/44.34, 13.24; 428/64.1–64.6; 430/270.11, 430/495.1, 945

See application file for complete search history.

(56) References Cited

U.S. PATENT DOCUMENTS

| | | | |
|---|---|---|---|
| 4,006,378 A | 2/1977 | Silverstein et al. | |
| 5,420,846 A * | 5/1995 | Sugiyama et al. | ........... 369/100 |
| 5,474,874 A | 12/1995 | Asai et al. | |
| 5,516,568 A | 5/1996 | Jung | |
| 5,529,864 A | 6/1996 | Tachibana et al. | |
| 5,569,517 A | 10/1996 | Tominaga et al. | |
| 5,591,500 A | 1/1997 | Kawanishi | |
| 5,610,879 A * | 3/1997 | Moriya et al. | ............. 369/13.24 |

(Continued)

FOREIGN PATENT DOCUMENTS

| | | |
|---|---|---|
| EP | 0 580 346 A2 | 1/1994 |
| JP | 52-44082 A | 4/1977 |
| JP | 5-12673 | 1/1993 |
| JP | 5-12715 | 1/1993 |
| JP | 6-28713 A | 2/1994 |

(Continued)

OTHER PUBLICATIONS

T. Shintani, et al., "A New Super-Resolution Film Applicable to Read-Only and Rewritable Optical Disks," Jpn. J. Appl. Phys., vol. 38 (1999) pp. 1656-1660.

*Primary Examiner*—Ali Neyzari
(74) *Attorney, Agent, or Firm*—Edwards Angell Palmer & Dodge LLP; David G. Conlin; Peter J. Manus

(57) ABSTRACT

An optical information recording medium includes a substrate formed in a concave-convex state by providing pits or grooves corresponding to recorded information, used for optically reproducing the information by irradiation of a light beam, and may also include a recording layer. The optical information recording medium includes a temperature responsive layer whose reflectance and/or transmittance for the light beam changes with a change in temperature caused by the irradiation of a light beam. With such an arrangement, the present invention provides an optical information recording medium enabling secure and highly accurate reproduction of information recorded with high density, and the recording and reproduction methods thereof.

14 Claims, 6 Drawing Sheets

U.S. PATENT DOCUMENTS

| | | |
|---|---|---|
| 6,187,406 B1 | 2/2001 | Ichihara et al. |
| 6,339,582 B1 | 1/2002 | Ichihara et al. |
| 6,461,710 B1 * | 10/2002 | Kikukawa et al. .......... 428/64.1 |
| 6,524,766 B1 * | 2/2003 | Ariyoshi et al. ........ 430/270.13 |
| 6,589,657 B2 | 7/2003 | Dannenberg |
| 6,790,502 B1 | 9/2004 | Yamamoto et al. |
| 6,844,092 B2 | 1/2005 | Yamamoto et al. |
| 6,961,300 B2 * | 11/2005 | Cheong et al. ............ 369/275.1 |
| 2001/0038900 A1 | 11/2001 | Todori et al. |
| 2003/0002428 A1 | 1/2003 | Byung-ki et al. |
| 2004/0240374 A1 | 12/2004 | Tajima et al. |
| 2005/0007937 A1 | 1/2005 | Mori et al. |

FOREIGN PATENT DOCUMENTS

| | | |
|---|---|---|
| JP | 06-243508 A | 9/1994 |
| JP | 07-223372 | 8/1995 |
| JP | 08-096412 | 4/1996 |
| JP | 08-111035 | 4/1996 |
| JP | 08096412 * | 4/1996 |
| JP | 08-124217 | 5/1996 |
| JP | 2001-05691 | 2/2001 |
| JP | 2001-032935 | 2/2001 |
| JP | 2001-035011 | 2/2001 |
| JP | 2001-35012 | 2/2001 |
| JP | 2001-067727 | 3/2001 |
| JP | 2001-067731 | 3/2001 |
| JP | 2001-84643 | 3/2001 |
| JP | 2001-084645 | 3/2001 |
| JP | 2001-101707 | 4/2001 |
| JP | 2001-189033 | 7/2001 |
| JP | 2001-202657 | 7/2001 |
| JP | 2001-243657 | 9/2001 |
| JP | 2001-273679 | 10/2001 |
| JP | 2002-025057 | 1/2002 |
| JP | 2002-056573 | 2/2002 |
| JP | 2002-109786 A | 4/2002 |
| JP | 2002-298439 A | 10/2002 |
| JP | 2002-367230 | 12/2002 |
| JP | 2003-091875 | 3/2003 |
| JP | 2004-355783 | 12/2004 |
| WO | WO-02/058060 | 7/2002 |

* cited by examiner

OPTICAL INFORMATION RECORDING MEDIUM, RECORDING AND REPRODUCTION METHODS USING THE SAME, OPTICAL INFORMATION RECORDING DEVICE, AND OPTICAL INFORMATION REPRODUCTION DEVICE

FIELD OF THE INVENTION

The present invention relates to an optical information recording medium, recording and reproduction methods using the same; and further relates to an optical information recording device, and an optical information reproduction device. More specifically, the present invention relates to an optical information recording medium for optically reproducing or both recording and reproducing information with an optical beam (e.g. a laser beam), such as an optical disk, in which recording density is improved by having a layer for changing the optical characteristic depending on temperature; recording and reproduction methods using such an optical information recording medium; an optical information recording device; and an optical information reproduction device.

BACKGROUND OF THE INVENTION

With the development of digitalization in the information-oriented society, there has been a demand for a writable medium which offers higher density recording and reproduction.

Under such a circumstance, there have been studies for various medium structures for a writable optical recording medium so as to improve its storage capacity. Also, in order to realize high density recording and reproduction, various methods have been attempted; for example, (i) a method of shortening wavelength of a laser beam used for recording and reproduction, (ii) a method of increasing NA (Numerical Aperture) of the objective lens used for condensing light onto the optical information recording medium, (iii) a method of providing multi-layered recording section to an optical information recording medium, and iv) a method of reducing the practical diameter of beam spot of a laser beam by providing a mask layer (also called a light-shutter layer), which blocks a part of the original diameter of the light.

This method of reducing the practical diameter of beam spot of a laser beam by providing a mask layer is described in Patent Document 1 and Patent Document 2, for example.

More specifically, the Patent Document 1 (Japanese Laid-Open Patent Application Tokukaihei 05-12673/1993 (published on Jan. 22, 1993) discloses an optical disk device for performing recording and reproduction by using change of reflectivity which is occurred in a concavo-convex state due to pits on the substrate of the optical disk. This optical disk device is provided with a temperature dependent light shutter layer on the medium layer (on a surface of the disk to which a laser beam is emitted from the objective lens) for signal recording. The temperature dependent light shutter layer, which absorbs reproduction laser wavelength at ordinary temperature, stops absorption when the temperature rises by reproduction laser power, and starts the absorption again as the temperature drops after the reproduction light condensing spot.

The Patent Document 1 further discloses another arrangement of an optical disk device for performing recording and reproduction by using change of reflectivity caused by phase change of the recording material. This optical disk device also includes the temperature dependent light shutter layer on the medium layer (on a surface of the disk toward which a laser beam is emitted from the objective lens) on which signals are recorded, which absorbs reproduction laser wavelength at ordinary temperature, and stops absorption when the temperature rises from reproduction laser power, and starts the absorption again as the temperature drops after passing through the reproduction light condensing spot.

Further, the Patent Document 2 (Japanese Laid-Open Patent Application Tokukaihei 05-12715/1993 (published on Jan. 22, 1993) discloses an optical recording medium including a recording film on the substrate, in which a light shutter layer is provided on the recording film so that light irradiation for reading or recording incident on the recording film is blocked just before entering to the recording film. The light shutter layer contains a thermochromic material as its main component, which gives a color to the light shutter layer for preventing transmission of light before the light irradiation for reading is carried out, and then, when the light irradiation for reading is carried out and temperature rises, the central portion of the irradiation area in the light shutter layer decolorizes and becomes light-transmissive.

In the foregoing methods, the optical information recording medium having concave-convex pits or a recording film on the substrate is provided with a mask layer on surface receiving incident light toward the pits or the recording film. The mask layer is generally formed by a thermochromic material or a phase change material. In the central portion of the irradiation part of the mask layer, the temperature rises due to incident of the light irradiation for reading etc., and therefore the central portion of the irradiation part is optically or thermally reacted and partly loses the color to be light-transmissive. On the other hand, the temperature rises only slightly or does not rise at all in a portion receiving weak incident light, such as periphery of the irradiation part or a portion where light is not incident, and therefore, such a portion has a light blocking property. As a result, the practical spot size can be reduced to be equal to the size of the central part of the irradiation part. More specifically, the mask layer allows light transmission only in a portion having high light intensity distribution, thus practically reducing the spot diameter of the incident light. Accordingly, it becomes possible to carry out recording and reproduction with a small pit, which enables recording and reproduction of an optical information recording medium with high density.

The thermochromic material or the phase change material for the mask layer (light shutter layer) disclosed in the Patent document 1 and the Patent document 2 shows the effect as a mask when the material is dissolved at a certain temperature. Since the material in the dissolved state has high fluidity, the original composition and formation of the material can be easily changed. Thus, in an optical information recording medium having such a mask layer showing the effect as a mask under a circumstance of a certain temperature, the mask effect will be gradually reduced due to the change of the original composition and formation, after a large number of recordings and/or reproductions is performed; and eventually, the effect will be completely lost. Thus, the foregoing conventional optical information recording medium has insufficient durability.

Further, the Patent Document 1 has such description that "This temperature dependent light transmittance changeable medium is formed by, for example, a polymeric material or an organic material . . . , a material whose transmittance is increased in a high temperature area may be adopted for such a material, for example. Such a change in transmittance may be caused by using a material whose light transmittance is increased from dissolution of the material, or may be caused by changing regularity of molecular alignment of a liquid crystal material. Further, the material may be a phase change material or the like, and the light transmittance of such a material can be changed, for example, by heating and cooling a chalcogenide in an amorphous state to cause crystallization." However, this description fails to describe a specific example of the material whose light transmittance is increased in a high temperature area. For this reason, the invention disclosed in the Patent Document 1 cannot be realized by those in the art, based on common technologies at the time when the Patent Document 1 is written or published.

SUMMARY OF THE INVENTION

The present invention is made in view of the foregoing demand for performing recording and reproduction with high density, and an object of the invention is to provide an optical information recording device capable of secure reproduction of information with high accuracy even when the information is recorded with high density; a recording method and a reproduction method using the medium; an optical information recording device; and an optical information reproduction device.

In order to solve the foregoing problems, an optical information recording medium according to the present invention which uses irradiation of a light beam for reproducing information recorded therein, includes: a temperature responsive layer whose reflectance and/or transmittance changes with a change in temperature caused by the irradiation of a light beam.

With the foregoing arrangement, it is possible to selectively carry out reproduction. More specifically, such selective recording and reproduction can be carried out in a low transmittance area (a high temperature area or a low temperature area) smaller than the spot size of a readout light beam, thus providing an optical information recording medium enabling secure and highly accurate reproduction of information recorded with high density. Therefore, while a conventional method not using a temperature responsive layer fails to read out a pit or the like smaller than the readout spot size of the optical system, the present invention enables readout of such a small pit or the like with high reproduction signal strength.

Further, in order to solve the foregoing problems, an optical information recording medium according to the present invention for storing information and for allowing reproduction of the information by irradiation of a light beam, includes: a temperature responsive layer whose reflectance and/or transmittance changes with a change in temperature caused by the irradiation of a light beam.

With the foregoing arrangement, recording can be selectively carried out in an area smaller than the spot size of a recording light beam, thus providing an optical information recording medium enabling secure and highly accurate recording with high density, in contrast to an optical information recording medium not including a temperature responsive layer. Further, when the medium has recorded information therein, the foregoing arrangement enables selective reproduction of the information in an area smaller than the spot size of an irradiation light beam, as with the case above. Therefore, the present invention provides an optical information recording medium enabling secure and highly accurate reproduction of information recorded with high density, in contrast to an optical information recording medium not including a temperature responsive layer.

In order to solve the foregoing problems, a reproduction method according to the present invention for reproducing information recorded on the foregoing optical information recording medium, includes the steps of: irradiating the optical information recording medium with a light beam by providing a high temperature section and a low temperature section in a light beam spot of the temperature responsive layer so that the transmittance of the temperature responsive layer decreases in the high temperature section; and reproducing the information with a light transmitted through the low temperature section of the temperature responsive layer. Further, a reproduction method according to the present invention for reproducing information recorded on the foregoing optical information recording medium, includes the step of: irradiating the optical information recording medium with a light beam by providing a high temperature section and a low temperature section in a light beam spot of the temperature responsive layer so that the transmittance of the temperature responsive layer decreases in the low temperature section; and reproducing the information with a light transmitted through the high temperature section of the temperature responsive layer.

With the foregoing methods, by reproducing information with a light transmitted through either the low temperature section or the high temperature section, the reproduction can be selectively carried out in an area smaller than the spot size of a readout light beam. Therefore, it is possible to securely and accurately reproduce information recorded on an optical information recording medium with high density.

In order to solve the foregoing problems, a recording method according to the present invention, includes the steps of: irradiating the optical information recording medium with a light beam by providing a high temperature section and a low temperature section in a light beam spot of the temperature responsive layer so that the transmittance of the temperature responsive layer decreases in the high temperature section; and heating a recording layer with a light transmitted through the high temperature section of the temperature responsive layer. Further, a recording method according to the present invention, includes the steps of: irradiating the optical information recording medium with a light beam by providing a high temperature section and a low temperature section in a light beam spot of the temperature responsive layer so that the transmittance of the temperature responsive layer decreases in the low temperature section; and heating a recording layer with a light transmitted through the high temperature section of the temperature responsive layer.

With the foregoing methods, by heating the recording layer with a light transmitted through either the low temperature section or the high temperature section, the recording can be selectively carried out in an area smaller than the spot size of a recording light beam. Therefore, it is possible to securely and accurately record information on an optical information recording medium with high density.

A reproduction method of an optical information recording medium according to the present invention is a reproduction method for the foregoing optical information recording medium, and enables recording of a minute recording mark less than a diffraction limit of a readout light beam, by using the temperature responsive layer. An optical information reproduction device according to the present invention is arranged to enable reproduction of a minute recording mark less than a diffraction limit of a readout light beam, by using the foregoing optical information recording medium and the foregoing reproduction method.

With the foregoing arrangement, it is possible to reproduce information of a minute recording mark less than a diffraction limit of a readout light beam.

A recording method of an optical information recording medium according to the present invention is a recording method for the foregoing optical information recording medium, and enables recording of a minute recording mark less than a diffraction limit of a recording light beam, by using a change in reflectance and/or transmittance of the temperature responsive layer with a change in temperature. An optical information recording device according to the present invention is arranged to enable recording of a minute recording mark less than a diffraction limit of a recording light beam, by using the foregoing optical information recording medium and the foregoing recording method.

With the foregoing arrangement, it is possible to record a minute recording mark less than a diffraction limit of a light beam.

Additional objects, features, and strengths of the present invention will be made clear by the description below. Further, the advantages of the present invention will be evident from the following explanation in reference to the drawings.

DESCRIPTION OF THE EMBODIMENTS

First Embodiment

One Embodiment of an optical information recording medium according to the present invention will be described below with reference to Figures.

Figure 1:
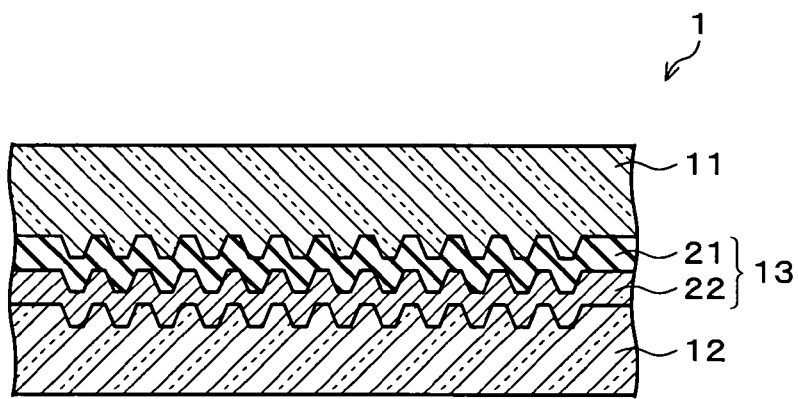
FIG. 1 is a partial cross sectional view illustrating a main portion of an optical information recording medium according to one Embodiment of the present invention.
Figure 2:
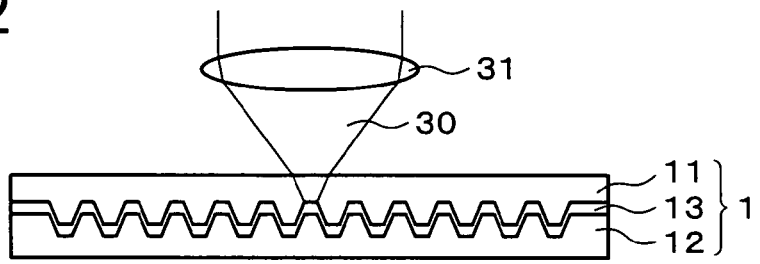
FIG. 2 is a schematic cross-sectional view illustrating an optical information recording medium according to one Embodiment of the present invention.

As shown in FIGS. 1 and 2, an optical information recording medium according to the present Embodiment is a reproduction-only optical information recording medium 1, and is constituted of a transparent resin layer 11, a temperature responsive reflection layer 13, and a substrate 12, which are formed in this order from the side receiving incident of a readout beam 30 (light beam used for reproduction). More specifically, the optical information recording medium 1 has such a structure that the temperature responsive reflection layer 13 is formed on the substrate 12, and the transparent resin layer 11 is further formed thereon. The readout beam 30 is incident on an internal face (the face facing the temperature responsive reflection layer 13) of the substrate 12 by passing through the transparent resin layer 11 and the temperature responsive reflection layer 13.

The transparent resin layer 11 is required to be transparent for the wavelength of the readout beam 30, so as to allow incident of the readout beam 30. With this arrangement, the optical information recording medium 1 receives incident light of the readout beam 30 from the transparent resin layer 11. The present invention does not particularly specify the material for constituting the transparent resin layer 11. For example, the material of the transparent resin layer 11 may be a thermoplastic transparent resin (plastic) such as a polycarbonate, an amorphous polyolefin, a thermoplastic polyimide, a PET (Polyethylene Terephthalate), a PEN (Polyether Nitrile), or a PES (Polyether Sulfone); a thermosetting transparent resin such as a thermosetting polyimide or an ultraviolet-curing acrylic resin; or a composition of any of these materials. Though its general desirable range of thickness is approximately 1 µm-100 µm, the transparent resin layer 11 may have a thickness around 0.1 mm-1.2 mm for offering appropriate strength of the optical information recording medium 1. Note that, the transparent resin layer 11 may instead be a layer made of other kinds of transparent material, for example, a glass or a composition of a glass and a transparent resin. The appropriate thickness of such a layer is approximately 0.1 mm$^{-1.2}$ mm.

The material for constituting the substrate 12 is required to offer an appropriate strength of the optical information recording medium 1. The optical characteristic of the material of the substrate 12 is however not particularly limited, and therefore the material does not have to be transparent. The material of the substrate 12 may be a glass; a thermoplastic transparent resin such as a polycarbonate, an amorphous polyolefin, a thermoplastic polyimide, a PET, a PEN, or a PES; a thermosetting transparent resin such as a thermosetting polyimide or an ultraviolet-curing acrylic resin; a metal; or a composition of any of these materials. The thickness of the substrate 12 is preferably 0.1 mm$^{-1.2}$ mm, however not particularly limited. Further, an appropriate pitch for the pits is approximately 0.3 µm-1.6 µm and an appropriate vertical interval of the pitch is approximately 30 nm-200 nm. Further, for the guiding grooves, an appropriate range is approximately 0.3 µm-1.6 µm for the pitch, and approximately 30 nm-200 nm for the depth.

The substrate 12 includes pits for creating a concave-convex surface and guiding grooves on its internal face (the face facing the temperature responsive reflection layer 13). The substrate 12 may include both the pits and the grooves, or either of the pits and the grooves.

The temperature responsive reflection layer 13 formed on the substrate 12 has such a function that the light transmittance with respect to the wavelength of the readout beam 30 decreases with a rise in temperature from irradiation of the readout beam 30. As shown in FIG. 1, the temperature responsive reflection layer 13 is constituted of a temperature responsive layer 21 and a reflection layer 22 in this order from the side receiving the light irradiation, i.e., from the side having the transparent resin layer 11.

The temperature responsive layer 21 contains a translucent material whose transmittance reversibly changes as the temperature changes; more specifically, the transmittance with respect to the wavelength of the readout light beam decreases as the temperature increases. As an example of the material for constituting the temperature responsive layer 21, preferably adopted is a material causing a change of the transmittance of the temperature responsive layer 21 with a rise in temperature in a certain wavelength range; to be more specific, when the temperature rises from 20° C. to 180° C., the light transmittance of the temperature responsive layer 21 decreases in a range between 20-80%. One example of such a material may be a thermochromic material whose transmittance is changed when the chemical structure is changed upon heat absorption. A specific example of the thermochromic material whose transmittance decreases with a change of the temperature may be an inorganic thermochromic material such as a metal oxide, or an organic thermochromic material such as a lactone, a fluorane, or the like which is mixed with an alkali; or a leuco dye material or the like mixed with an organic acid. The most preferable material among these is a metal oxide, which changes the width of its forbidden band with a change of temperature, and changes the transmittance of wavelengths of its absorption edge. With this characteristic, the metal oxide is not likely to change its composition or structure even when it causes a chemical change of structure due to a change of temperature, and therefore it is superior in durability. For example, ZnO (Zinc Oxide) in particular, $SnO_2$, $CeO_2$, $NiO_2$, $In_2O_3$, $TiO_2$, $Ta_2O_5$, $VO_2$, $SrTiO_3$, or the like can be used as the metal oxide material. Further, a compound semiconductor, such as a GaN, a SiC, a ZnS etc., in which the forbidden band width exists in the vicinity of the wavelength of the readout light beam, can also provide the same effect. The thickness of temperature responsive layer 21, which depends on the material, is preferably not less than 200 nm, and more appropriately in a range of 500 nm-800 nm. Accordingly, the preferred material of the temperature responsive layer 21 is a ZnO (Zinc Oxide) film with a thickness of equal to or greater than 200 nm.

Note that, the Patent Document 2 (Japanese Laid-Open Patent Application Tokukaihei 05-12715/1993 (published on Jan. 22, 1993) suggests only some organic materials as the thermochromic material, and the examples are insufficient in terms of thermostability and are not practically durable for repeated reproduction. The temperature responsive layer 21 made of an inorganic thermochromic material, such as a metal oxide or the like, is noticeable for its adequacy in thermostability.

The reflection layer 22 is preferably made of a metal film with high reflectance, such as an Al film, an Au film, an Ag film, or an alloy film of any of these metals. The thickness of the reflection layer 22 is not particularly limited and may be specified to realize a desired reflectance. For example, the thickness may be in a range of 20 to 100 nm, for example.

With such a structure, a reproduction-only optical information recording medium 1, which does not include a recording film, is realized. This optical information recording medium 1 can be a CD (Compact Disc), a CD-ROM (Compact Disc Read Only Memory), a DVD (Digital Versatile Disc), a DVD-ROM (Digital Versatile Disc Read Only Memory), for example.

Next, the following will explain a reproduction method of the optical information recording medium 1.

The optical information recording medium 1 can be reproduced by using a laser light source (not shown) and an optical system such as a light condensing lens 31, in such a manner that the readout beam 30 is incident on the internal face (the face provided with either of pits or grooves) of the substrate 12 through the transparent resin layer 11, and the light reflected on the face is detected by an optical head (not shown).

Figure 5:
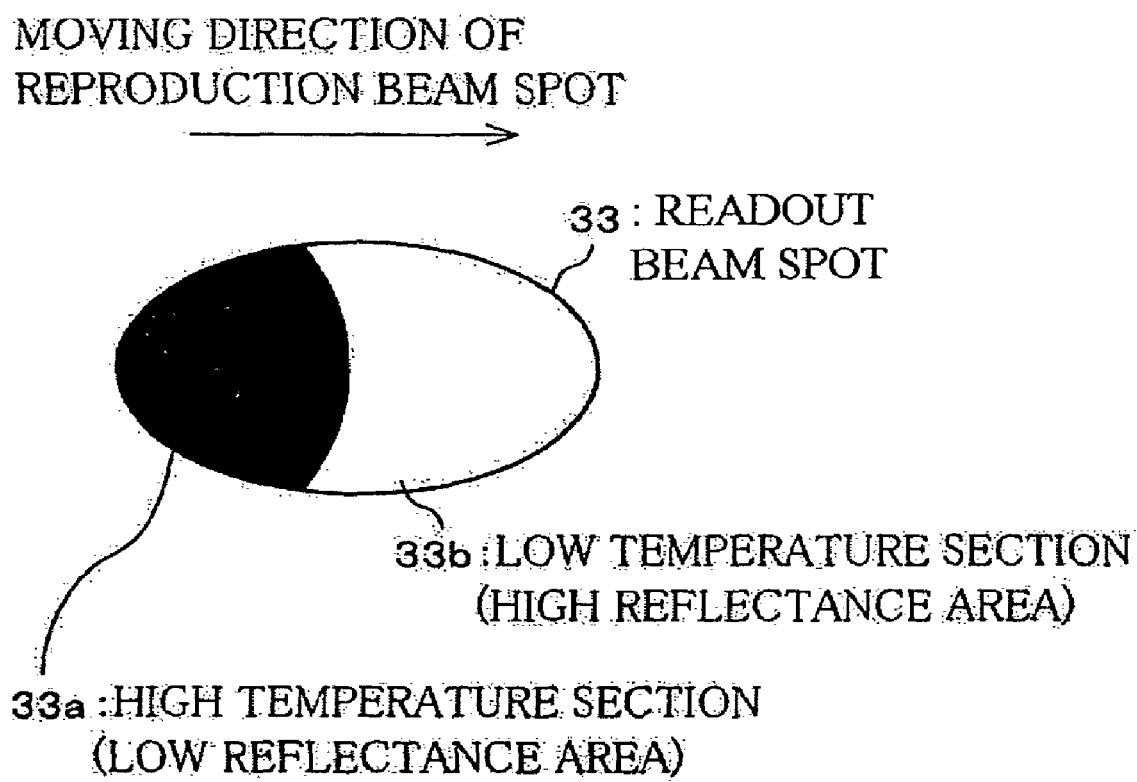
FIG. 5 is a drawing for explaining a mask effect of a temperature responsive reflection layer, and illustrates temperature distribution and reflectivity distribution in a readout beam spot of the temperature responsive layer.

Here, the irradiation of the readout beam 30 with respect to the optical information recording medium 1 is carried out by providing a high temperature portion and a low temperature portion in the light beam spot of the temperature responsive layer 21. For example, when the readout beam 30 is incident on the side having the transparent resin layer 11 and scans the front surface of the reproduction-only optical information recording medium 1 in a predetermined direction, there arises temperature gradient in a readout beam spot 33 of the front surface of the temperature responsive layer 21 in a traveling direction of the readout beam spot 33, as shown in FIG. 5. As a result, the readout beam spot 33 of the front surface of the temperature responsive layer 21 has a high temperature section 33a and a low temperature section 33b. The temperature in the high temperature section 33a is equal to or greater than 20° C. and less than 60° C., and the temperature of the low temperature section 33b is equal to or greater than 60° C. and less than 180° C.

In the high temperature section 33a where the temperature rises upon incident of the readout beam 30, the transmittance of the temperature responsive layer 21 with respect to the wavelength of the readout beam 30 decreases (in a low transmittance state), and therefore, much of the incident light is blocked by the temperature responsive layer 21. Accordingly, the quantity of light transmitted through the temperature responsive layer 21 decreases, and the quantity of light incident on the reflection layer 22 formed on the rear surface of the temperature responsive layer 21 also decreases. As a result, since the quantity of light reflected by the reflection layer 22 is reduced, the reflectance on the whole of the temperature responsive reflection layer 13 decreases. On the other hand, in the low temperature section 33b having lower temperature than that of the high temperature section 33a, the transmittance of the temperature responsive layer 21 with respect to the wavelength of the readout beam 30 increases, and the quantity of light incident on the reflection layer 22 on the rear surface of the temperature responsive layer 21 also increases. As a result, since the quantity of light reflected by the reflection layer 22 increases, the reflectance on the whole of the temperature responsive reflection layer 13 increases. To be more specific, the temperature responsive reflection layer 13 is turned to low reflectance state with the temperature equal to or greater than 60° C. and less than 180° C., and is turned to high reflectance state with the temperature equal to or greater than 20° C. and less than 60° C., for example.

In the temperature responsive layer 21 in such a condition, there arises a difficulty in transmission of the readout beam 30 in the later half of the readout beam spot 33, i.e., the high temperature section 33a. Therefore, the reproduction of information is carried out by using the light which is transmitted through the low temperature section 33b, and blocked by the high temperature section 33a of the temperature responsive layer 21. More specifically, upon reproduction, since the high temperature section 33a operates as a mask of the substrate 12, the optical head only detects the light transmitted through the low temperature section 33a where the temperature does not rise, as the reflection light of the surface of the substrate 12. On this account, it is possible to reduce the size of the reproduction area in the front surface (the surface where information is recorded) of the substrate 12 which is provided with pits or grooves to be smaller than the readout beam spot 33 on the temperature responsive reflection layer 13. Accordingly, the size of the reproduction area can be further reduced, and reproduction resolution can be improved. Therefore, it becomes possible to securely reproduce information corresponding to the minute pits and/or grooves provided on the front surface (the surface where information is recorded) of the substrate 12, particularly the pits and/or grooves less than the diffraction-limit of the readout light beam, with a greater reproduction signal strength. As described, with such a manner, the optical information recording medium according to the present Embodiment uses the temperature responsive layer 21 to be capable of reproducing minute recording marks provided as pits or grooves on the front surface (the surface for recording information) of the substrate 12 even when the marks are less than the diffraction-limit of the readout light beam.

Further, in contrast to the Patent Document 1 which improves reproduction resolution by improving transmittance of the high temperature section with a mask layer, the present Embodiment realizes improvement of the reproduction resolution by decreasing the transmittance of the high temperature section 33a with the temperature responsive layer 21.

The mask layer for increasing the transmittance of the high temperature section is made of a thermochromic material, which operates as a mask in a dissolved state when temperature becomes a certain level or greater, or a phase change material etc. Such a mask layer however causes a problem of a decrease of the mask effect when the recording and/or reproduction is repeatedly performed.

On the other hand, the present Embodiment uses the temperature responsive layer 21 so as to reduce the transmittance of the high temperature section 33a. Since the temperature responsive layer 21 can be made of a metal oxide or the like, which is not dissolved when the temperature rises upon recording or reproduction, the mask effect of the temperature responsive layer 21 does not decrease even when recording and/or reproduction is repeatedly performed. On this account, the optical information recording medium 1 of the present Embodiment is superior in durability.

Further, the optical information recording medium 1 of the present Embodiment has such a structure that the reflection layer 22 is formed on the temperature responsive layer 21 on a surface opposite to that irradiated with a light beam, and the temperature responsive layer 21 and the reflection layer 22 constitute the temperature responsive reflection layer 13 in which the reflectance with respect to the irradiation of the light beam decreases with the rise of temperature from the light beam irradiation. This structure is based on a reflection-type, super-resolution reproduction method. The principle of the reflection-type, super-resolution reproduction method is fundamentally different to that of the conventional super resolution reproduction method (the methods adopted in the Patent Documents 1 and 2) which adds a mask layer to a light beam irradiation surface so as to change the transmittance.

Figure 6:
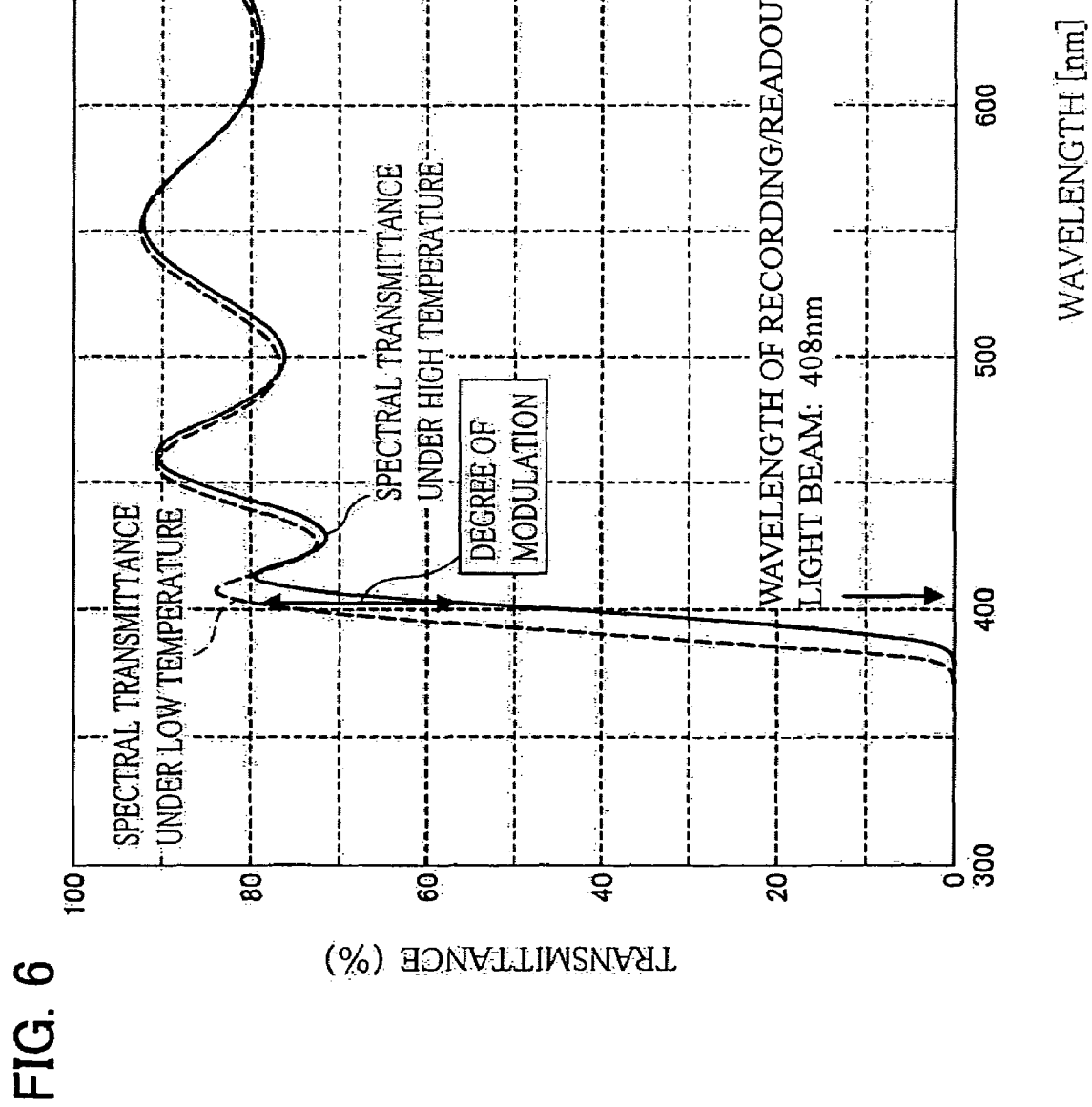
FIG. 6 is a graph showing an example of a change in temperature of spectral transmittance characteristic of the temperature responsive layer.

In order to decrease the spectral transmittance with respect to the wavelength of the readout light beam, the temperature responsive layer 21 is preferably arranged so that a low transmittance area generated by the absorption of a shorter wavelength at a ordinary temperature includes the wavelength of the readout light beam; and when the low transmittance area generated by the absorption of a shorter wavelength (in FIG. 6, the area from the vicinity of the maximum value (the top) of transmittance (interference) closest to the recording reproduction wavelength of 408 nm in the longer wavelength side, to the vicinity of the absorption edge (where the transmittance drops to 0) of the wavelength in the shorter wavelength side) is shifted to a direction toward a longer wavelength from the recording reproduction wavelength of 408 nm. Further, in order to decrease the spectral transmittance with respect to the readout beam 30, the temperature responsive layer 21 is preferably arranged so that the wavelength of the absorption edge (a lower limit of the absorption band existing in an ultraviolet/visible area) in the shorter wavelength side is shorter than the wavelength of the readout beam 30; and the absorption edge of the shorter wavelength side is shifted to the longer wavelength side depending on a rise of the temperature. For example, when the wavelength of the readout beam 30 is in a range from 380 nm to 415 nm (408 nm, for example), the temperature responsive layer 21 is preferably made of a ZnO film whose wavelength in the absorption edge on the shorter wavelength side is around 375 nm at an ordinary temperature.

As can be seen in FIG. 6, which shows the spectral transmittance characteristic of a ZnO film, the wavelength in the absorption edge in the shorter wavelength side is shifted to the longer wavelength side with rise of the temperature. As a result, transmittance of the ZnO film decreases in the high temperature section 33a where the temperature has risen due to incident of light, since the spectral transmittance of the wavelength of the readout beam 30 decreases. Note that, the light transmittance in the ZnO film is kept high in the low temperature section 33b where the temperature is relatively low. Further, in the portion of the ZnO film where the temperature rises, the absorption edge in the shorter wavelength side of the spectral transmittance characteristic is shifted back to the shorter wavelength side when the temperature goes back to low again, and the spectral transmittance increases. With this effect, degree of modulation (change of spectral transmittance in the wavelength of the readout beam 30 between the high temperature section 33a and the low temperature section 33b) can be increased. On this account, it is possible to securely mask the high temperature section 33a, and securely obtain high reproduction signal strength.

Figure 7:
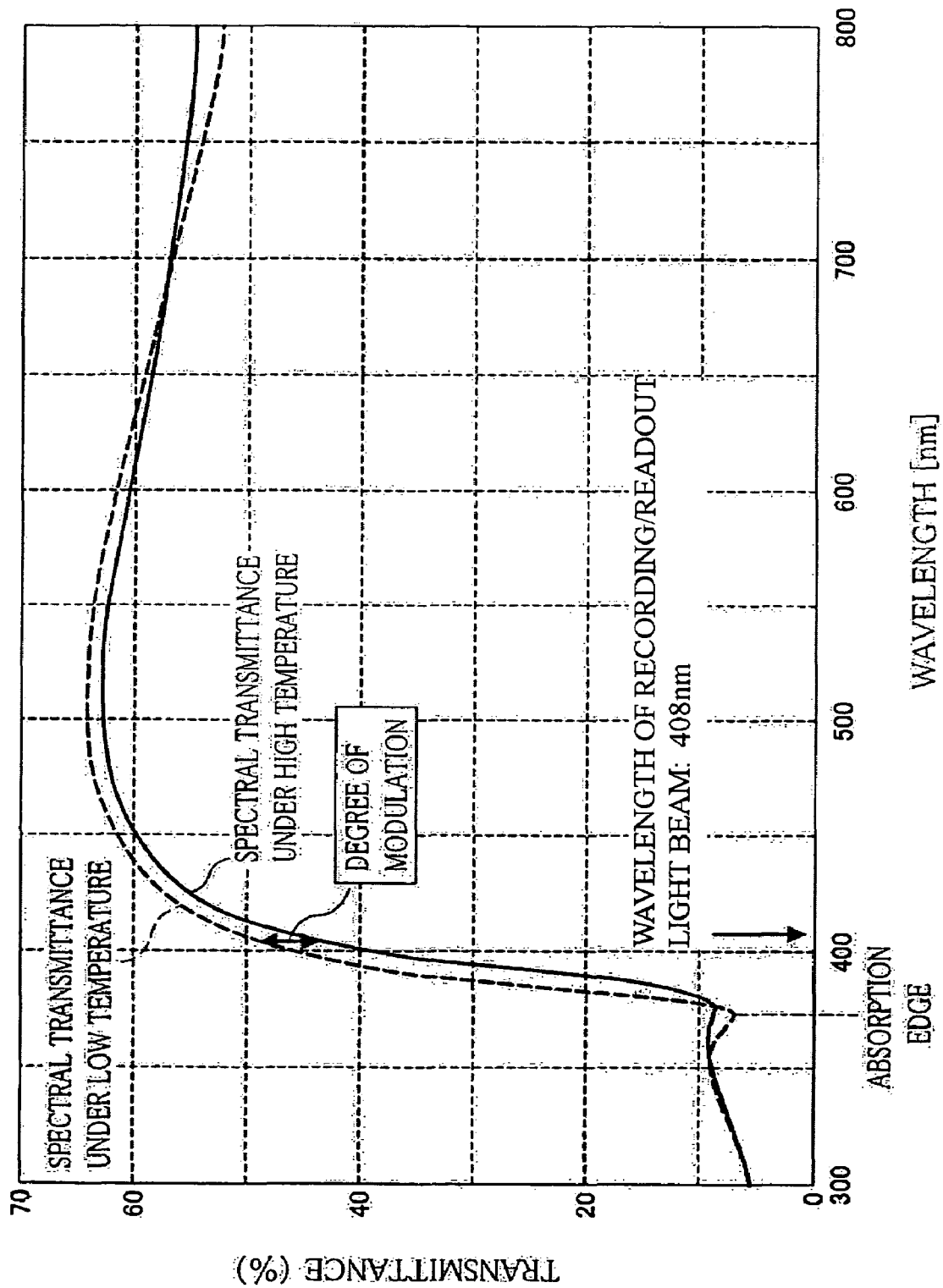
FIG. 7 is a graph showing an example of a change by temperature of spectral transmittance characteristic of the temperature responsive layer, and shows a case where the temperature responsive layer has a small thickness, and there exists no minimum value caused by an optical interference effect.
Figure 8:
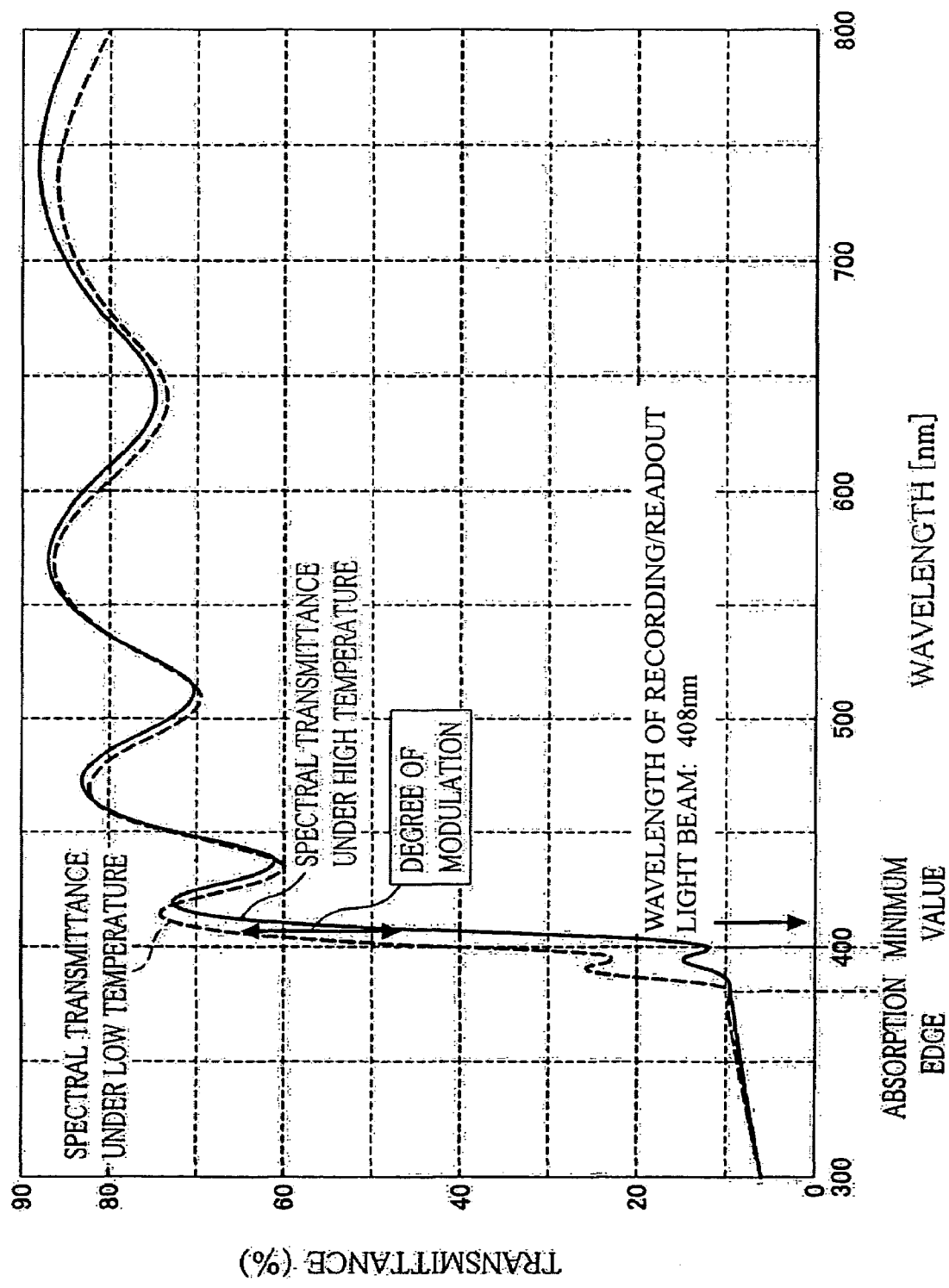
FIG. 8 is a graph showing an example of a change by temperature of spectral transmittance characteristic of the temperature responsive layer, and shows a case where the temperature responsive layer has a large thickness, and there exists a minimum value caused by an optical interference effect.

Further, in the temperature responsive layer 21, the change of the temperature of the transmittance characteristic is preferably controlled by using optical interference effect between the reflection light on one surface and the reflection light on the other surface. For the spectral reflectance characteristic of the temperature responsive layer 21, it is preferable that the minimum value caused by the optical interference effect between the reflection light on one surface and the reflection light on the other surface exists in the vicinity (preferably within ±20 nm, further preferable within ±10 nm) of the wavelength of the light beam. When the temperature responsive layer 21 has a large thickness of equal to or greater than 200 nm, there causes the optical interference effect between the reflection light on one surface and the reflection light on the other surface, and such an optical interference effect generates a minimum value (400 nm in FIG. 8) of the spectral reflectance characteristic of the temperature responsive reflection layer 13, as shown in FIG. 8. With this effect, inclination of the reflectance in the vicinity of the absorption edge becomes steeper, and the degree of modulation (change of spectral transmittance in the wavelength of the readout beam 30 between the high temperature section 33a and the low temperature section 33b) can be increased. On this account, it is possible to securely mask the high temperature section 33a, and securely obtain high reproduction signal strength. Note that, the temperature responsive layer 21 having a thickness less than 200 nm does not cause such an optical interference effect, and therefore the spectral reflectance characteristic of the temperature responsive reflection layer 13 has no minimum values, as shown in FIG. 7.

Note that, FIG. 6 shows the spectral reflectance characteristics in the vicinity of the absorption edge of the temperature responsive layer 21 made of a ZnO film having the thickness of 400 nm, under a circumstance of a low temperature (30° C.) and under a circumstance of a high temperature (200° C.). FIG. 7 shows the spectral reflectance characteristics in the vicinity of the absorption edge of the temperature responsive reflection layer 13 made of a ZnO film having the thickness of 100 nm and a Al film having the thickness of 50 nm, under a circumstance of a low temperature (30° C.) and under a circumstance of a high temperature (200° C.). FIG. 8 shows the spectral reflectance characteristics in the vicinity of the absorption edge of the temperature responsive reflection layer 13 made of a ZnO film having the thickness of 400 nm and a Al film having the thickness of 50 nm, under a circumstance of a low temperature (30° C.) and under a circumstance of a high temperature (200° C.).

Such changes of the wavelength in the absorption edge of the temperature responsive layer 21 are caused by a change of temperature in the width of the forbidden band of a metal oxide semiconductor. The same effect can be caused by other metal oxides than a ZnO, such as a $SnO_2$, $CeO_2$, $NiO_2$, $In_2O_3$, $TiO_2$, $Ta_2O_5$, $VO_2$, $SrTiO_3$. Further, a compound semiconductor, such as a GaN, a SiC, a ZnS etc., in which the forbidden band width exists in the vicinity of the wavelength of the readout light beam, can also provide the same effect.

One example of the optical information recording medium 1 according to the present Embodiment will be described below.

In this example of the optical information recording medium 1 according to the present Embodiment, the transparent resin layer 11 has a thickness of approximately 0.1 mm. Further, in this example, the substrate 12 is provided with a concave/convex state by forming pits corresponding to the recorded information on the internal face (the face facing the temperature responsive reflection layer 13). Further, in the present example, the temperature responsive layer 21 is made of a ZnO film having a thickness of approximately 200 nm. Further, the reflection layer 22 is made of an Al film having a thickness of approximately 30 nm in the present example.

The optical information recording medium according to the present Embodiment may be manufactured with the following method, for example.

Firstly, a metal film to be the reflection layer 22 and the temperature responsive layer 21 are deposited in this order by a magnetron sputtering method on the substrate 12, which has a surface (information recording surface) provided with pits and/or grooves corresponding to the recorded information. Then, in order to protect the information recording surface and the temperature responsive reflection layer 13 from external environment, the temperature responsive reflection layer 13 is subjected to spin-coating with an ultraviolet-curing acrylic resin or the like, which becomes a transparent resin layer 11 when cured by ultraviolet irradiation.

Note that, the explanation above describes the case where the light beam for reproducing information is incident on the optical information recording medium 1 from the side having the transparent resin layer 11; however, the optical information recording medium of the present invention also allow an arrangement of carrying out irradiation of the light beam for reproducing information from the side having the substrate 12, in the same layer structure as that of the optical information recording medium 1 (however, the temperature responsive layer 21 and the reflection layer 22 should be inversely positioned to constitute the temperature responsive reflection layer 13). In this arrangement, however, a protection layer is preferably formed on a surface of the temperature responsive reflection layer 13 opposite to that having the substrate 12.

The substrate 12 in this arrangement is preferably made of a material allowing incident of the readout light beam and also offering an appropriate strength to the optical information recording medium 1. For example, the material may be a glass; a thermoplastic transparent resin such as a polycarbonate, an amorphous polyolefin, a thermoplastic polyimide, a PEN, or a PES; a thermosetting transparent resin such as a thermosetting polyimide or an ultraviolet-curing acrylic resin; or a composition of any of these materials. Typically, an appropriate thickness of the substrate 12 is in a range from 0.3 mm to 1.2 mm.

The protection layer in this arrangement may be made of any materials capable of protecting the temperature responsive reflection layer 13. As a specific example, the materials for the substrate 12 listed above may also be used for the material of the protection layer. Note that, the protection layer may be either a transparent layer or an opaque layer. A general appropriate thickness of the protection layer is in a range from 1 µm to 100 µm.

Further, the optical information recording medium of the present invention is preferably arranged so that only one surface of the substrate 12 is provided with pits and/or grooves; however, the present invention allows an arrangement of providing pits and/or grooves on both surfaces of the substrate 12.

Second Embodiment

Another Embodiment of the present invention will be described below with reference to FIGS. 3 and 4. For ease of explanation, materials having the equivalent functions as those shown in the drawings pertaining to Embodiment 1 above will be given the same reference symbols, and explanation thereof will be omitted here.

Figure 3:
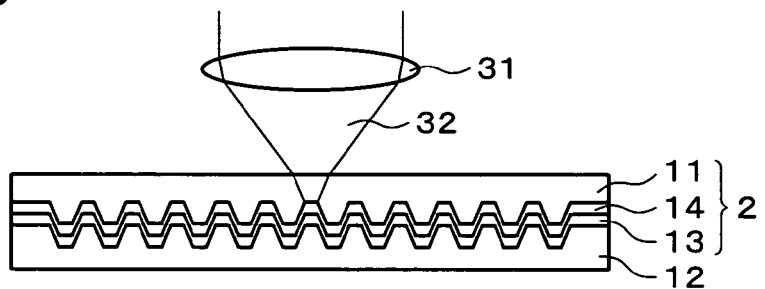
FIG. 3 is a schematic cross-sectional view illustrating an optical information recording medium according to another Embodiment of the present invention.
Figure 4:
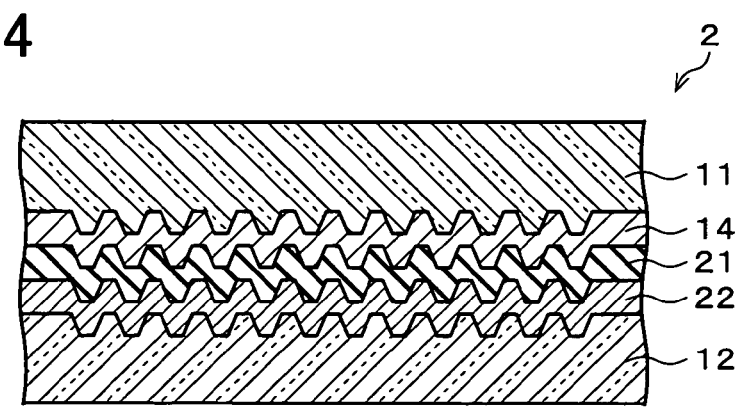
FIG. 4 is a partial cross-sectional view illustrating a main portion of the optical information recording device shown in FIG. 3.

As shown in FIGS. 3 and 4, an optical information recording medium according to the present Embodiment is an optical information medium 2 for recording and reproduction (a recordable medium or a rewritable medium), in which a transparent resin layer 11, a recording layer 14, a temperature responsive reflection layer 13 and a substrate 12 are formed in this order from the side receiving a recording/readout beam 32 used for recording and reproduction. As with Embodiment 1, the temperature responsive reflection layer 13 includes a temperature responsive layer 21 and a reflection layer 22 in this order from the side receiving the recording/readout beam 32 (the side of the transparent resin layer 11).

The recording layer 14 may be made of a material for recording typically used in the relevant field. For example, an organic dye material such as a cyanine or a phthalocyanine may be used for a recordable optical information recording medium 2. Further, in case of a rewritable (recording, reproduction and deletion type) optical information recording medium 2, an magnetooptical recording material such as a TbFeCo, or a phase change recording material such as an AgInSbTe, a GeTeSb, or an AgInSb can be used. When the optical information recording medium 2 is constituted of a magnetooptical recording material such as a TbFeCo, the recording layer 14 preferably has a lamination structure made of a dielectric layer made of a dielectric material such as a SiN (Silicon Nitride), a recording layer made of an magnetooptical material, and a protection layer made of a protection material such as a SiN. Further, when the optical information recording medium 2 is constituted of a phase change recording material such as an AgInSbTe, GeTeSb, or an AgInSb, the recording layer 14 preferably has a lamination structure made of a dielectric layer made of a $ZnS$—$SiO_2$ film, a recording layer made of a phase change material such as an AgInSbTe, GeTeSb, or an AgInSb, and a protection layer made of a ZnS—SiO$_2$ film. The thickness of the recording layer 14 is not limited but a range of 5 nm-500 nm is appropriate.

As with Embodiment 1, the substrate 12 may be either transparent or opaque as long as it offers appropriate strength to the optical information recording medium 1. As a specific example, the materials for the substrate 12 listed above may be used. The thickness of the substrate 12 is not limited and a range from 0.1 mm to 1.2 mm is appropriate. Note that, in the present Embodiment, the substrate 12 having pits or grooves may instead be a flat substrate.

The transparent resin layer 11 and the temperature responsive reflection layer 13 are the same as those in Embodiment 1, except for the recording layer 14 provided therebetween.

With such a structure, an optical information recording medium including a recording film is realized. This optical information recording medium can be a CD-R (Compact Disc Recordable), a CD-RW (Compact Disc ReWritable), a DVD-R (Digital Versatile Disc Recordable), a DVD-RW (Digital Versatile Disc ReWritable), for example.

Further, the optical information recording medium 2 can be reproduced by the same method as that for the optical information recording medium 1 of Embodiment 1. Namely, the optical information recording medium 2 can be reproduced by using a laser light source (not shown) and an optical system such as a light condensing lens 31, in such a manner that the recording/readout beam 32 is incident on the recording layer 14 from the side of the transparent resin layer 11. Here, the irradiation of the recording/readout beam 32 is carried out by providing a high temperature portion and a low temperature portion in the light beam spot of the temperature responsive layer 21, so as to decrease transmittance in the high temperature portion of the temperature responsive layer 21. Then, an optical head (not shown) detects the reflection light of the recording layer 14, so as to reproduce information based on the light transmitted through the low temperature section of the temperature responsive layer 21.

The optical information recording medium 2 includes the temperature responsive reflection layer 13 on the rear surface (the surface opposite to that irradiated with the recording/readout beam 32) of the recording layer 14, i.e., the surface not irradiated with a light beam, and therefore, when the recording/readout beam 32 is guided to a guiding groove of the transparent substrate upon reproduction, the recording/readout beam 32 is incident on the temperature responsive layer 13 via the recording layer 14. The incident of the recording/readout beam 32 raises the temperature of the temperature responsive reflection layer 13 so that the later half of the readout beam spot has a high temperature, while the remaining portion has a low temperature. Further, since the temperature responsive reflection layer 13 has a characteristic for causing a decrease of reflectance with a rise in temperature, the high temperature section has a low reflectance and the low temperature section has a high reflectance. On this account, the information recorded on the recording layer 14 may be reproduced with a small opening (low temperature section) less than the optical spatial resolution (the diffraction limit of the readout light beam). Thus, it is possible to realize high quality reproduction of information recorded with high density. With such a manner, the optical information recording medium according to the present Embodiment uses the temperature responsive layer 21 to be capable of reproducing a minute recording mark less than the diffraction-limit of the readout light beam, which is provided on the recording layer 14.

Further, the optical information recording medium 2 according to the present Embodiment, in which the temperature responsive layer 21 is provided on the rear surface of the recording layer 14, i.e., the surface not receiving the incident light, is more advantageous in the following regards than the arrangements disclosed in the Patent Documents 1 and 2 in which a mask layer is provided on the side receiving the incident light. That is, it is possible to more easily raise the temperature of the temperature responsive layer 21 by using optical interference effect with the temperature responsive layer 21 provided on the rear surface of the recording layer 14. Consequently, reproduction may be carried out with lower laser power, thus realizing an optical information recording medium offering high reproduction sensitivity.

Further, as with Embodiment 1, the optical information recording medium 2 according to the present Embodiment includes the temperature responsive layer 21 in which the transmittance decreases in the high temperature section 33a, and therefore the temperature responsive layer 20 can be made of a metal oxide or the like, which is not dissolved by a rise in temperature upon recording or reproduction. On this account, the temperature responsive layer 21 can maintain the mask effect even when recording or reproduction is repeatedly performed, thus offering superior durability.

The method for performing recording of the optical information recording medium 2 is not limited, but one preferable example can be such a manner that the optical information recording medium 2 is irradiated with the recording/readout beam 32 with higher laser power than that for reproduction, so as to heat the recording layer 14. Further, the irradiation of the light beam is carried out by providing a high temperature section and a low temperature section in the light beam spot of the temperature responsive layer 21 so that the transmittance decreases in the high temperature section of the temperature responsive layer 21. Then, with the light transmitted through the low temperature section of the temperature responsive layer 21, it is possible to selectively heat a minute area of the recording layer 14. In this manner, it is possible to record information in the minute area of the recording layer 14, thus realizing high density recording.

Figure 9:
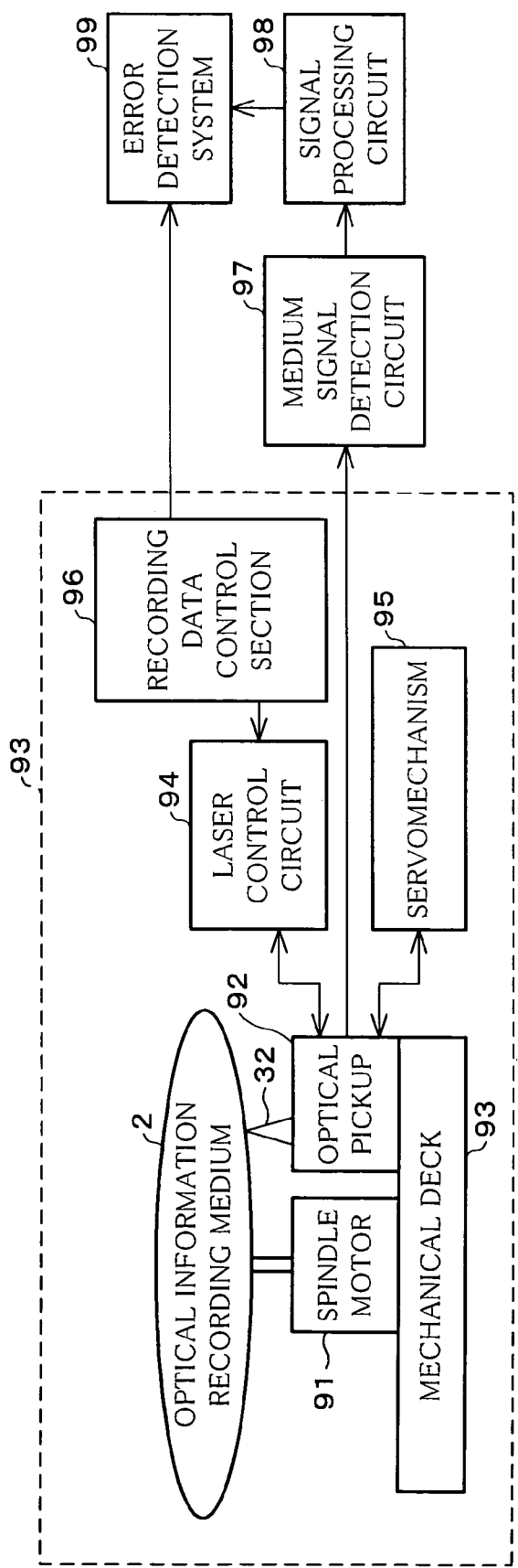
FIG. 9 is a block diagram illustrating an arrangement of one Embodiment of an optical information recording and reproduction device according to the present invention.

Further, FIG. 9 shows an optical information recording and reproduction device (optical information reproduction device, optical information recording device) which may be used for performing recording and reproduction of the optical information recording medium according to the present Embodiment. FIG. 9 is a block diagram showing an arrangement of one Embodiment of the optical information recording and reproduction device according to the present invention.

As shown in FIG. 9, the optical information recording and reproduction device includes a spindle motor 91 for rotating the optical information recording medium 2, an optical pickup (optical irradiator, optical detector) 92 for emitting the recording/readout light beam 32 and detecting the reflection light of the recording layer 14, a mechanical deck 93 for supporting the spindle motor 91 and the optical pickup 92, a laser control circuit 94 for controlling laser power of the optical pickup 92, a servomechanism 95 for changing the position of the mechanical deck 93 according to an output of the optical pickup 92, a recording data control section 96 for controlling the laser control circuit 94 according to an information signal corresponding to the target information for recording, so as to control laser power of the optical pickup 92, a medium signal detection circuit 97 for detecting a information signal from the reflection light detected by the optical pickup 92, a signal processing circuit 98 for processing the information signal detected by the medium signal detection circuit 97, an error detection system 99 for detecting error of the information signal.

The optical pickup 92 emits the recording/readout beam 32 (laser beam) with respect to the recording layer 14 from the side of the transparent resin layer 11, by using a laser light source (not shown) and an optical system such as a light condensing lens 31. Further, the optical pickup 92 carries out the irradiation of the recording/readout beam 32 with respect to the optical information recording medium 2, by providing a high temperature portion and a low temperature portion in the light beam spot of the temperature responsive layer 21, so as to decrease transmittance of the temperature responsive layer 21 in the high temperature portion. Then, the optical pickup 92 detects the reflection light of the recording layer 14 with an optical head (not shown).

In the foregoing optical information recording and reproduction device, the laser control circuit 94 controls the laser power of the optical pickup 92 so that the optical information recording medium 2 is irradiated with a high-power laser beam for recording or deletion, and with a low-power laser beam for reproduction.

In the respective Embodiment described above, the transmittance of the temperature responsive layer 21 with respect to the wavelength of a readout light beam decreases with a rise in temperature. However, the transmittance of the temperature responsive layer 21 does not necessarily decrease with a rise in temperature even when the temperature responsive layer 21 has the transmittance characteristics shown in FIGS. 6 through 8, depending on the setting of the wavelength of a readout light beam. More specifically, in the temperature responsive layer 21 with the transmittance characteristics shown in FIGS. 6 through 8, the transmittance decreases with respect to a wavelength of 405 nm, but may increase with a rise in temperature with respect to a wavelength of longer than 405 nm. The present invention is also effective for the case of setting a wavelength to cause an increase of the transmittance at a high temperature. In other words, the present invention allows a use of the temperature responsive layer 21 whose transmittance for the readout light beam increases with a rise in temperature.

The optical information recording medium 1 or 2, in which the transmittance for a readout light beam of the temperature responsive layer 21 increases with a rise in temperature, can be reproduced by such a method that the light beam irradiation is carried out by providing a high temperature portion and a low temperature portion in the light beam spot of the temperature responsive layer 21, so as to increase transmittance of the temperature responsive layer 21 in the high temperature portion, and an optical head (not shown) detects the reflection light of the recording layer 14, so as to reproduce information with the light transmitted through the high temperature section of the temperature responsive layer 21.

Further, recording of the optical information recording medium 2, in which the transmittance for a readout light beam of the temperature responsive layer 21 increases with a rise in temperature, can be performed by such a method that the light beam irradiation is carried out by providing a high temperature portion and a low temperature portion in the light beam spot of the temperature responsive layer 21, so as to increase transmittance in the high temperature portion of the temperature responsive layer 21, and an optical head (not shown) detects the reflection light of the recording layer 14, so as to selectively heat a minute area of the recording layer 14 with the light transmitted through the high temperature section of the temperature responsive layer 21.

Further, the optical information recording medium 2 above includes the temperature responsive layer 21 on the surface opposite to that irradiated with the light beam; however, the present invention allows an arrangement in which the temperature responsive layer 21 is provided on the surface irradiated with the recording/readout beam 32, in the recording layer 14. The optical information recording medium having this arrangement is insufficient in terms of reproduction sensitivity compared to the optical information recording medium 2; however, it ensures superior durability than the arrangement disclosed in the Patent Documents 1 and 2.

Further, for the optical information recording medium 2 in which a readout light beam is incident on the side of substrate 12, the optical information recording medium 2 may include the recording layer 14 on the side of the temperature responsive reflection layer 13 on which the light beam is incident, i.e., between the substrate 12 and the temperature responsive reflection layer 13.

Note that, the present invention is not limited to those Embodiments described above but may be applied in many variations within the scope of the patent claims set forth below. For example, the optical information recording medium of the present invention is not necessarily in the form of a disk, i.e., a circular optical disk but may be in the form of a card or a sheet, for example. Further, the optical information recording medium according to the present invention does not limit the method for optically performing recording and reproduction, and the optical information recording medium of the present invention may be a different type of optical information recording medium, such as an megnetooptical disk, a phase-change-type optical disk or other various media.

Further, the optical information recording medium of the present invention may have a lamination structure made up of plural layers of either of the layer structure of the First Embodiment and the layer structure of the Second Embodiment. Such a lamination structure may be made of two substrates respectively provided with the temperature responsive reflection layer 13, or both the temperature responsive reflection layer 13 and the recording layer 14. The two substrates are then bonded together in a state where the respective temperature responsive reflection layers 13 and the respective recording layers 14 are opposite to each other, so as to accept light irradiation from both surfaces.

Further, the technical range of the present invention also includes a combination of the different technical means disclosed in the respective Embodiments above. For example, the optical information recording medium of the present invention may have a hybrid structure including a reproduction-only face based on the layer structure of First Embodiment, and a recording/reproduction face based on the layer structure of Second Embodiment.

As described, an optical information recording medium according to the present invention which uses irradiation of a light beam for reproducing information recorded therein, includes: a temperature responsive layer whose reflectance and/or transmittance changes with a change (rise) in temperature caused by the irradiation of a light beam.

With the foregoing arrangement, upon irradiation of a light beam, the transmittance of the temperature responsive layer changes, more specifically, decreases or increases, in a portion where the temperature rises due to the light irradiation, but does not change in the remaining portion where the temperature does not rise and kept low. Thus, it is possible to selectively carry out reproduction in an area smaller than the spot size of a readout light beam, thus providing an optical information recording medium enabling secure and highly accurate reproduction of information recorded with high density. Therefore, while a conventional method not using a temperature responsive layer fails to read out a pit or the like smaller than the readout spot size of the optical system, the present invention enables readout of such a small pit or the like with high signal strength.

The foregoing optical information recording medium which uses irradiation of a light beam for reproducing recorded information can be a CD-ROM for example, which operates as a reproduction-only memory (reproduction-only ROM) by having a surface previously formed in a concave-convex state by providing pits thereon. As a typical structure for such a CD-ROM, an optical information recording medium which uses irradiation of a light beam for optically reproducing the information by having a concave and convex substrate provided with pits or grooves corresponding to the recorded information is further provided with a temperature responsive layer whose transmittance for irradiation of a light beam changes with a change in temperature. Note that, there will be some difficulties to realize the foregoing optical information recording medium without providing the concave and convex substrate provided with pits or grooves; however, a possible alternative may be a structure previously provided with the guiding grooves or pits with a laser before carrying out recording or reproduction of information, as with a magnetic disk. Such structure has however never been enforced before.

Further, as described, an optical information recording medium according to the present invention for recording information and for reproducing the information by irradiation of a light beam, includes: a temperature responsive layer whose reflectance and/or transmittance changes with a change in temperature caused by the irradiation of a light beam.

With the foregoing arrangement, upon irradiation of a light beam, the transmittance of the temperature responsive layer changes, more specifically, decreases or increases, in a portion where the temperature rises due to the light irradiation, but does not change in the remaining portion where the temperature does not rise and kept low. Thus, it is possible to selectively carry out recording in an area smaller than the spot size of a recording light beam, thus providing an optical information recording medium enabling secure and highly accurate recording of information with high density, compared to a conventional method not using a temperature responsive layer. Therefore, while a conventional method not using a temperature responsive layer fails to read out a pit or the like smaller than the readout spot size of the optical system, the present invention enables readout of such a small pit or the like with high signal strength. Further, when the medium has recorded information, it is possible to selectively carry out reproduction in an area smaller than the spot size of a readout light beam, as with the foregoing example. Accordingly, it is possible to provide an optical information recording medium enabling secure and highly accurate reproduction of information recorded with high density, compared to a conventional method not using a temperature responsive layer.

Note that, the foregoing optical information recording medium for recording information and for reproducing the information by irradiation of a light beam may be a medium operating as a recording/reproduction RAM (such as a phase change medium, or an magnetooptical (MO) recording medium), or a write-once medium (one using coloring material, an inorganic film etc.). As a typical structure for such media, an optical information recording medium including a recording layer for optically recording information and optically reproducing the information by irradiation of a light beam is further provided with a temperature responsive layer whose transmittance for irradiation of a light beam changes with a change in temperature caused by the irradiation.

Note that, an example of the temperature responsive layer whose reflectance changes with a change in temperature may be a lamination layer made of two laminated layers: a layer of a material whose refractive index (real part/imaginary part) changes depending on temperature, such as a ZnO (Zinc Oxide); and a reflection layer made of an Al film or the like.

It is preferable that the reflectance and/or the transmittance of the temperature responsive layer changes by an interference effect between a reflection light of the light beam reflected on one face of the temperature responsive layer and a reflection light of the light beam reflected on the other face of the temperature responsive layer. Further, it is preferable that the temperature responsive layer is arranged so that a low transmittance wavelength domain (the domain from the vicinity of the maximum value of the transmittance closest to the wavelength of the irradiation light beam in the longer wavelength side, to the vicinity of the absorption edge of the shorter wavelength side) generated by absorption of a shorter wavelength side at an ordinary temperature includes a wavelength of a readout light beam, and the low transmittance wavelength domain is shifted toward a longer wavelength side by a certain degree of rise in temperature of the temperature responsive layer, so that a spectral transmittance and/or a spectral reflectance with respect to the wavelength of a readout light beam changes. Further, for the spectral reflectance characteristic of the temperature responsive layer, the minimum value due to the optical interference effect between a reflection light of the light beam reflected on one face of the temperature responsive layer and a reflection light of the light beam reflected on the other face preferably exist in the vicinity of the wavelength of a light beam.

With the foregoing arrangement, by causing the optical interference effect between a reflection light of the light beam reflected on one face of the temperature responsive layer and a reflection light of the light beam reflected on the other face, and using the optical interference effect to control change of temperature for the transmittance characteristic and/or the reflectance characteristic of the temperature responsive layer, it is possible to increase the change (degree of modulation) of the transmittance and/or the reflectance with the change in temperature. Consequently, the mask effect by the temperature responsive layer further improves, thus securely and highly accurately carrying out reproduction with a smaller diameter than that of irradiation light spot of a light beam.

The temperature responsive layer is arranged so that a low transmittance wavelength domain generated by absorption of a shorter wavelength side at an ordinary temperature includes a wavelength of a readout light beam, and the low transmittance wavelength domain is shifted toward a longer wavelength side by a certain degree of rise in temperature of the temperature responsive layer, so that a spectral transmittance and/or a spectral reflectance with respect to the wavelength of a readout light beam decreases.

Note that, it is preferable that the transmittance of the temperature responsive layer for the light beam irradiation decreases with a rise in temperature due to the light beam irradiation. In contrast to the Patent Document 1, which improves reproduction resolution by improving transmittance of the high temperature section with a mask layer, the foregoing structure realizes improvement of the reproduction resolution by decreasing the transmittance of the high temperature section in the temperature responsive layer.

The mask layer for increasing the transmittance of the high temperature section is made of a thermochromic material, which operates as a mask in a dissolved state when temperature becomes a certain level or greater, or a phase change material etc. Such a mask layer however causes a problem of a decrease of the mask effect when the recording and/or reproduction is repeatedly performed.

As described before, the mask layer disclosed in Patent Documents 1 and 2 causes a problem of degradation of mask effect when recording and/or reproduction is repeatedly performed. On the other hand, the foregoing structure uses the temperature responsive layer so as to reduce the transmittance of the high temperature section. Since the temperature responsive layer can be made of a metal oxide or the like, which is not dissolved when the temperature rises upon recording or reproduction, the mask effect of the temperature responsive layer does not decrease even when recording and/or reproduction is repeatedly performed. On this account, it is possible to provide an optical information recording medium superior in durability.

The temperature responsive layer preferably contains a metal oxide whose reflectance and/or transmittance changes with a change in temperature, particularly a zinc oxide.

With the foregoing arrangement, since the temperature responsive layer is not dissolved when the temperature rises upon recording or reproduction, the mask effect of the temperature responsive layer does not decrease even when recording and/or reproduction is repeatedly performed. On this account, it is possible to provide an optical information recording medium superior in durability.

It is preferable that the reflectance and/or the transmittance of the temperature responsive layer changes by not less than ±2% in a certain wavelength domain within a temperature range for reproducing the information.

With the foregoing arrangement, the mask effect by the temperature responsive layer further improves, thus securely and highly accurately carrying out reproduction with a smaller diameter than that of irradiation light spot of a light beam. Note that, apart from a zinc oxide, such a characteristic of the foregoing material that the reflectance and/or the transmittance changes by not less than ±2% in a certain wavelength domain within a temperature range for reproducing the information is often seen in an oxide semiconductor, such as $CeO_2$, $SnO_2$, $In_2O_3$, $ZrO_2$, $SrTiO_3$, $TiO_2$ or the like.

Further, in an optical information recording medium including a recording layer for optically recording information, it is preferable that the temperature responsive layer is provided on the rear surface of the recording layer which is opposite to the surface irradiated with the recording/readout beam. The foregoing arrangement in which the temperature responsive layer is provided on a the recording layer on a surface opposite to that irradiated with the recording/readout beam is more advantageous in the following regard than the arrangement of the Patent Documents 1 and 2, which includes a mask layer on the light irradiation surface of the recording layer. That is, in the structure of the Patent Documents 1 and 2 in which the recording layer is provided on the substrate, the mask layer is provided on the light irradiation surface of the recording layer, and therefore, the mask layer absorbs a certain part of the whole quantity of the light beam entering to the recording layer. This may cause such as a decrease of recording sensitivity or an increase of reproduction noise and degrades signal quality. In contrast, the foregoing structure in which the temperature responsive layer is provided on the recording layer on a surface opposite to that irradiated with the recording/readout beam can more easily raise temperature of the temperature responsive layer by using optical interference effect. Consequently, reproduction may be carried out with lower laser power, thus realizing an optical information recording medium offering high reproduction sensitivity.

A reproduction method according to the present invention for reproducing information recorded on an optical information recording medium having a temperature responsive layer whose reflectance and/or transmittance changes with a change in temperature caused by the irradiation of a light beam, comprising the steps of: irradiating the optical information recording medium with a light beam so that a high temperature section and a low temperature section are generated in a light beam spot of the temperature responsive layer, and the transmittance of the temperature responsive layer decreases in the high temperature section; and reproducing the information with a light transmitted through the low temperature section of the temperature responsive layer. Further, another reproduction method according to the present invention for reproducing the foregoing optical information recording medium, comprising the steps of: irradiating the optical information recording medium with a light beam so that a high temperature section and a low temperature section are generated in a light beam spot of the temperature responsive layer, and the transmittance of the temperature responsive layer decreases in the low temperature section; and reproducing the information with a light transmitted through the high temperature section of the temperature responsive layer.

With the foregoing methods, reproduction can be selectively carried out in an area smaller than the spot size of a readout light beam by reproducing the information with a light transmitted through the low temperature section or the high temperature section of the temperature responsive layer, thus securely and highly accurately carrying out reproduction of an optical information recording medium in which information is recorded with high density.

In the reproduction method according to the present invention, reproduction power is preferably controlled to optimize the super-resolution effect (by maximizing signal amplitude).

A recording method according to the present invention for recording information onto an optical information recording medium having a temperature responsive layer whose reflectance and/or transmittance changes with a change in temperature caused by the irradiation of a light beam, comprising the steps of: irradiating the optical information recording medium with a light beam so that a high temperature section and a low temperature section are generated in a light beam spot of the temperature responsive layer, and the transmittance of the temperature responsive layer decreases in the high temperature section; and heating a recording layer with a light transmitted through the low temperature section of the temperature responsive layer. Further, another recording method according to the present invention for the foregoing optical information recording medium, comprising the steps of: irradiating the optical information recording medium with a light beam so that a high temperature section and a low temperature section are generated in a light beam spot of the temperature responsive layer, and the transmittance of the temperature responsive layer decreases in the low temperature section; and heating a recording layer with a light transmitted through the high temperature section of the temperature responsive layer.

With the foregoing methods, recording can be selectively carried out in an area smaller than the spot size of a recording light beam by heating a recording layer with a light transmitted through the low temperature section or the high temperature section of the temperature responsive layer, thus securely and highly accurately carrying out recording of an optical information recording medium with high density.

A reproduction method according to the present invention is a reproduction method for the foregoing optical information recording medium, and uses the foregoing temperature responsive layer for enabling reproduction of a minute recording mark less than a diffraction limit of a readout light beam. An optical information reproduction device according to the present invention reproduces a minute recording mark less than a diffraction limit of a readout light beam with the foregoing optical information recording medium and the foregoing reproduction method.

With the foregoing reproduction method and the reproduction device, it is possible to reproduce a minute recording mark less than a diffraction limit of a readout light beam.

A recording method according to the present invention is a recording method for the foregoing optical information recording medium, and uses the foregoing temperature responsive layer whose transmittance and/or reflectance changes with a change in temperature, for enabling recording of a minute recording mark less than a diffraction limit of a recording light beam. An optical information recording device according to the present invention records a minute recording mark less than a diffraction limit of a recording light beam with the foregoing optical information recording medium and the foregoing recording method.

With the foregoing recording method and the recording device, it is possible to record a minute recording mark less than a diffraction limit of a recording light beam.

The Embodiments and concrete examples of implementation discussed in the foregoing detailed explanation serve solely to illustrate the technical details of the present invention, which should not be narrowly interpreted within the limits of such Embodiments and concrete examples, but rather may be applied in many variations within the spirit of the present invention, provided such variations do not exceed the scope of the patent claims set forth below.

What is claimed is:

1. An optical information recording medium storing information which can be reproduced by irradiation of a light beam, comprising:
   a temperature responsive layer consisting of a zinc oxide film whose reflectance and/or transmittance changes with a change in temperature caused by the irradiation of a light beam.

2. The optical information recording medium as set forth in claim 1, wherein:
   the reflectance and/or the transmittance of the temperature responsive layer changes by an interference effect between a reflection light of the light beam reflected on one face of the temperature responsive layer and a reflection light of the light beam reflected on the other face of the temperature responsive layer.

3. An optical information recording medium storing information which can be reproduced by irradiation of a light beam comprising:
   a temperature responsive layer whose reflectance and/or transmittance changes with a change in temperature caused by the irradiation of a light beam and arranged so that a low transmittance wavelength domain generated by absorption of a shorter wavelength side at an ordinary temperature includes a wavelength of a reproduction light beam, and the low transmittance wavelength domain Is shifted toward a longer wavelength side by a certain degree of rise in temperature of the temperature responsive layer, so that a spectral transmittance and/or a spectral reflectance with respect to the wavelength of a reproduction light beam decreases.

4. The optical information recording medium as set forth in claim 1, wherein:
   the reflectance and/or the transmittance of the temperature responsive layer changes by not less than ±2% in a certain wavelength domain within a temperature range for reproducing the information.

5. The optical information recording medium as set forth in claim 1, wherein:
   the temperature responsive layer enables reproduction of a minute recording mark less than a diffraction limit of a reproduction light beam, by a change in reflectance and/or transmittance for a light beam with a change in temperature.

6. The optical information recording medium as set forth in claim 1, wherein:
   the transmittance of the temperature responsive layer decreases with a rise in temperature.

7. The optical information recording medium as set forth in claim 1, further comprising:
   a substrate having a surface formed in a concave-convex state by providing pits and grooves corresponding to recorded information; and
   a reflection layer formed on the substrate,
   wherein:
   the temperature responsive layer is formed on the reflection layer.

8. An optical information recording medium for storing information and for allowing reproduction of the information by irradiation of a light beam, comprising:
   a temperature responsive layer consisting of a zinc oxide film whose reflectance and/or transmittance changes with a change in temperature caused by the irradiation of a light beam.

9. The optical information recording medium as set forth in claim 8, wherein:
   the reflectance and/or the transmittance of the temperature responsive layer changes by an interference effect between a reflection light of the light beam reflected on one face of the temperature responsive layer and a reflection light of the light beam reflected on the other face of the temperature responsive layer.

10. An optical information recording medium comprising:
    a temperature responsive layer whose reflectance and/or transmittance changes with a change in temperature caused by the irradiation of a light beam is arranged so that a low transmittance wavelength domain generated by absorption of a shorter wavelength side at an ordinary temperature includes a wavelength of a reproduction light beam, and the low transmittance wavelength domain is shifted toward a longer wavelength side by a certain degree of rise in temperature of the temperature responsive layer, so that a spectral transmittance and/or a spectral reflectance with respect to the wavelength of a reproduction light beam decreases.

11. The optical information recording medium as set forth in claim 1, wherein:
    the reflectance and/or the transmittance of the temperature responsive layer changes by not less than ±2% in a certain wavelength domain within a temperature range for reproducing the information.

12. The optical information recording medium as set forth in claim 1, wherein:
    the temperature responsive layer enables reproduction of a minute recording mark less than a diffraction limit of a reproduction light beam, by a change in reflectance and/or transmittance for a light beam with a change in temperature.

13. The optical information recording medium as set forth in claim 8, wherein:
    the transmittance of the temperature responsive layer decreases with a rise in temperature.

14. The optical information recording medium as set forth in claim 8, further comprising:
    a reflection layer; and
    the recording layer formed on the reflection layer,
    wherein:
    the temperature responsive layer is formed on the recording layer.

* * * * *